E. S. FARSON.
Ice-Cream Freezer.

No. 19,733.  Patented Mar. 23, 1858.

Witnesses:  Inventor:

UNITED STATES PATENT OFFICE.

ENOCH S. FARSON, OF PHILADELPHIA, PENNSYLVANIA, ASSIGNOR TO HIMSELF AND HENRY H. BROWN, OF SAME PLACE.

CREAM-FREEZER.

Specification of Letters Patent No. 19,733, dated March 23, 1858.

*To all whom it may concern:*

Be it known that I, ENOCH S. FARSON, of the city of Philadelphia, in the State of Pennsylvania, have invented a new and useful Improvement in Cream-Freezers; and I do hereby declare that the following is a full, clear, and exact description of the construction and operation of the same, reference being had to the accompanying drawings, making a part of this specification, in which—

Figure 1:
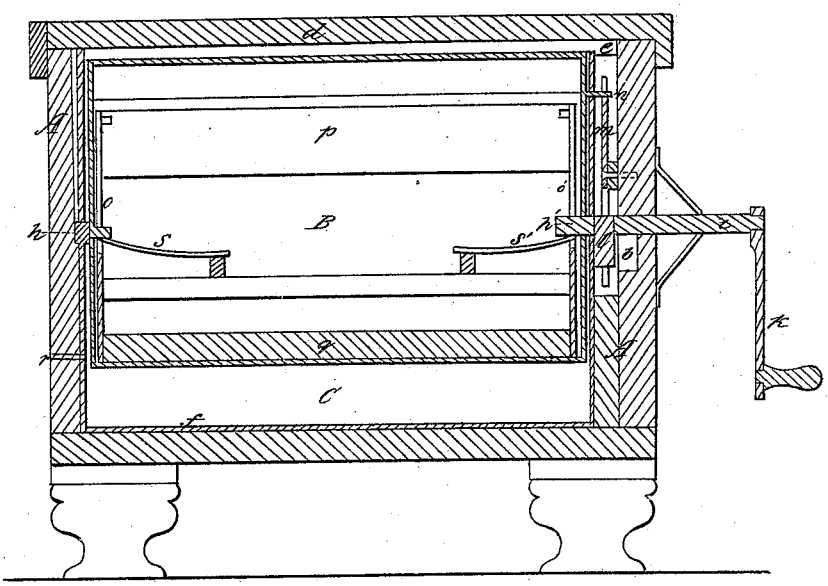
Figures 2, 3:
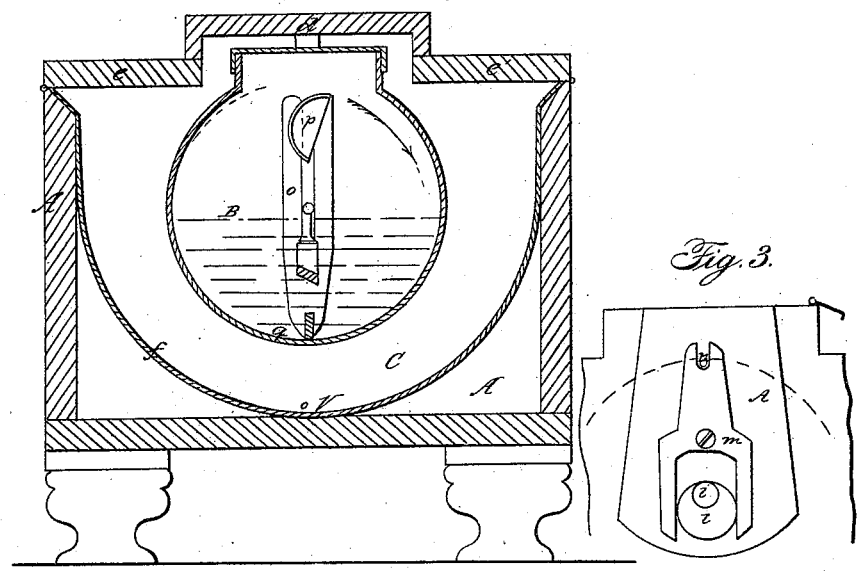

Figure 1, represents a longitudinal vertical section of the apparatus; and Fig. 2, a transverse section of the same—like letters in the different figures indicating the same parts.

The chief defect in the cream freezers in general use, consists in their not producing a uniform smoothness or plasticity throughout the whole mass of the frozen cream; and to remedy this defect is the object of my invention.

It consists in arranging the cream cylinder so that it shall oscillate in a horizontal position, in the ice chamber, on rotating its shaft; and in constructing the beater so as to cause it to force air through the cream as it is carried around in the cylinder in operating the machine.

Referring to the drawings—A is the rectangular containing box; B, the cream cylinder; and, C, the ice chamber.

The case (A) is made of wood, and is supported upon legs so as to raise it to a convenient height; and also, at its upper side, with a movable cover, d, and two hinged lids, e, e', so as to afford convenient access to the ice chamber and cream cylinder. The bottom of the ice chamber (C) is formed by bending the metallic lining, so as to be concentric with the lower side of the cylinder, as shown at f. The cylinder (B) has an opening fitted with a movable cover, the whole length of its upper side, for the admission and withdrawal of the cream and the beater frame. It is suspended upon the journals, h and h', so as to be oscillated thereon when the shaft, i, is rotated by means of the crank, k,—the said shaft (i) carrying an eccentric, l, which oscillates a forked piece, m, pivoted to the end of the case, and connected with the cylinder (B) by means of a small stud, n, which projects therefrom and enters a slot in the upper end of the piece (m) as fully shown in Fig. 3. The same shaft (i) also carries around the beater and scraper frame—which consists of the two slotted end pieces, o and o', connected together by means of the beater, p, scraper, q, and spring piece, r. The slots allow of the frame being both introduced into and withdrawn from the cylinder, and also of a yielding motion on the springs, s, s, so as to cause the latter to bear against the journals in the slots and thus press the scraper, q, against the sides of the cylinder. The beater (p) is concave on the side which is in the direction of its motion, and its ends also closed, so as to cause it to hold a portion of air when it enters into the cream during the rotary motion of the frame. The end of the journal (h') is grooved across so as to enter the slot in the end piece (o') of the frame as the latter is inserted, and thus carries the frame around when the shaft (i) is rotated. A recess, t, is made in the case so as to admit therein the eccentric (l) and allow the partial withdrawal of the shaft and thus the release of the cream cylinder, as occasion may require. v, is a waste hole through which any superfluous water may be withdrawn from the ice chamber.

Operation: Ice and salt are placed in the ice chamber (C) in the usual manner, and the cream poured into the cylinder (B) until it is about half full; both are then closed and continuous rotary motion given to the beater and scraper frame, in the direction of the arrow, until the freezing is completed. The beater (p), as it passes downwardly through the cream, necessarily carries with it a portion of air and afterward allows its gradual escape upwardly through the cream as it descends; and in rising out of the cream on the opposite side, it lifts a portion of the same up and throws it over to the other side: at the same time the scraper (q) constantly removes the cooled or frozen cream from the interior surface of the cylinder as it is formed thereon. While these operations are going on, the cylinder itself is oscillated continuously in the ice and salt, in the chamber (C), so as to keep the said compound in constant and close contact with the cream cylinder, which latter result, is an indispensable requirement for speedy freezing.

It will be perceived that in the operation of this machine, the most perfect uniformity and smoothness or plasticity in the frozen cream will be the result, because the air, which is, almost constantly, forced into it by the operation of the concave beater (*p*), will keep up such a porous and light condition in the mass, as will effectually prevent, with the assistance of the agitating operation of the beater itself and the scraper, the formation of the solid lumps so common in ice cream made in the usual freezers; and that the oscillatory motion given to the cylinder will be amply sufficient to keep the salt and ice in the required close contact with the cylinder.

What I claim as my invention and desire to secure by Letters Patent is—

The concave beater (*p*) in combination with a scraper (*q*) and an oscillating horizontally placed cream cylinder (B); the same being arranged so as to operate together in the manner and for the purpose set forth and described.

ENOCH S. FARSON.

Witnesses:
 BENJ. MORISON,
 HENRY H. BROWN.